US011729067B2

(12) United States Patent
Chou et al.

(10) Patent No.: US 11,729,067 B2
(45) Date of Patent: Aug. 15, 2023

(54) MANAGEMENT DATA ANALYTICAL KPIS FOR 5G NETWORK TRAFFIC AND RESOURCE

(71) Applicant: Apple Inc., Cupertino, CA (US)

(72) Inventors: Joey Chou, Scottsdale, AZ (US); Yizhi Yao, Chandler, AZ (US)

(73) Assignee: Apple Inc., Cupertino, CA (US)

( * ) Notice: Subject to any disclaimer, the term of this patent is extended or adjusted under 35 U.S.C. 154(b) by 162 days.

(21) Appl. No.: 17/256,787

(22) PCT Filed: Aug. 6, 2019

(86) PCT No.: PCT/US2019/045330
§ 371 (c)(1),
(2) Date: Dec. 29, 2020

(87) PCT Pub. No.: WO2020/033424
PCT Pub. Date: Feb. 13, 2020

(65) Prior Publication Data
US 2021/0160147 A1    May 27, 2021

Related U.S. Application Data

(60) Provisional application No. 62/714,964, filed on Aug. 6, 2018.

(51) Int. Cl.
*H04L 41/147* (2022.01)
*H04L 41/5025* (2022.01)
(Continued)

(52) U.S. Cl.
CPC ........ *H04L 41/147* (2013.01); *H04L 41/5025* (2013.01); *H04L 43/0817* (2013.01); *H04L 43/14* (2013.01); *H04W 36/0055* (2013.01)

(58) Field of Classification Search
CPC ............... H04L 41/147; H04L 41/5025; H04L 43/0817; H04L 43/14; H04W 36/0055
See application file for complete search history.

(56) References Cited

U.S. PATENT DOCUMENTS 9,277,431 B1 *   3/2016   Podolsky ................ H04L 43/08
9,439,081 B1 *   9/2016   Knebl ..................... G06N 20/00
(Continued)

FOREIGN PATENT DOCUMENTS

CN          105052191          11/2015
CN          105262664          1/2016
(Continued)

OTHER PUBLICATIONS

International Search Report and Written Opinion for International Application No. PCT/US2019/045330 dated Nov. 28, 2019, 9 pgs.
(Continued)

*Primary Examiner* — Tejis Daya
(74) *Attorney, Agent, or Firm* — Kowert, Hood, Munyon, Rankin & Goetzel, P.C.

(57) ABSTRACT

Systems and methods of providing a management data analytics service are described. After receiving a request for a management data analytical KPI, the MDAS producer determines from which of network objects to collect the performance measurements to generate the management analytical data. The network objects include an NF, NSI, NSSI, subnetwork or the network. Performance data is collected for a past period and management analytical data generated based on the collected performance data. The KPI for a future period related to the past period is determined. The KPI is to predict uplink or downlink traffic volume or resource utilization associated with the network object.

20 Claims, 7 Drawing Sheets

(51) Int. Cl.
    *H04L 43/0817*     (2022.01)
    *H04L 43/00*     (2022.01)
    *H04W 36/00*     (2009.01)

(56) References Cited

U.S. PATENT DOCUMENTS

| | | | |
|---|---|---|---|
| 9,900,790 B1* | 2/2018 | Sheen | G06N 20/20 |
| 2015/0106166 A1* | 4/2015 | Gutierrez, Jr. | G06Q 10/06393 |
| | | | 705/7.39 |
| 2016/0112275 A1* | 4/2016 | Park | H04L 41/0681 |
| | | | 709/224 |
| 2017/0141973 A1* | 5/2017 | Vrzic | H04W 76/11 |
| 2017/0230252 A1 | 8/2017 | Khasnabish | |
| 2017/0289047 A1* | 10/2017 | Szilágyi | H04L 41/5067 |
| 2017/0366462 A1 | 12/2017 | Soelberg et al. | |
| 2018/0026853 A1* | 1/2018 | Spector | H04L 41/5009 |
| | | | 709/224 |
| 2018/0129195 A1* | 5/2018 | Lee | G05B 23/0259 |
| 2018/0332485 A1* | 11/2018 | Senarath | H04L 41/044 |
| 2019/0149425 A1* | 5/2019 | Larish | H04L 43/08 |
| | | | 706/16 |
| 2019/0150017 A1* | 5/2019 | Yao | H04W 24/10 |
| | | | 370/252 |
| 2020/0322854 A1* | 10/2020 | Ryoo | H04W 36/0085 |
| 2020/0389843 A1* | 12/2020 | Huang | H04W 8/08 |
| 2021/0022024 A1* | 1/2021 | Yao | H04W 36/0085 |
| 2023/0044727 A1* | 2/2023 | Pantelidou | G06N 20/00 |

FOREIGN PATENT DOCUMENTS

| | | |
|---|---|---|
| EP | 3288239 A1 | 2/2018 |
| WO | 2017204539 | 11/2017 |

OTHER PUBLICATIONS

Office Action for CN Patent Application No. 201980052493.4; 22 pages; Jan. 4, 2023.

* cited by examiner

MANAGEMENT DATA ANALYTICAL KPIS FOR 5G NETWORK TRAFFIC AND RESOURCE

PRIORITY CLAIM

This application claims the benefit of priority to U.S. Provisional Patent Application Ser. No. 62/714,964, filed Aug. 6, 2018, which is incorporated herein by reference in its entirety.

TECHNICAL FIELD

Embodiments pertain to radio access networks. Some embodiments relate to use of the Management Data Analytics Service in various radio access technologies (RATs) including cellular and wireless local area network (WLAN) networks, including Third Generation Partnership Project Long Term Evolution (3GPP LTE) networks and LTE advanced (LTE-A) networks as well as $4^{th}$ generation (4G) networks and $5^{th}$ generation (5G) networks.

BACKGROUND

The use of 3GPP LTE systems (including LTE and LTE-Advanced systems) has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated, especially with the advent of next generation (NG) (or new radio (NR)) systems.

To add further complexity to the variety of services provided by the network devices, many physical implementations of the network devices are propriety and may be unable to incorporate new or adjusted physical components to compensate for different network conditions. This has led to the development of Network Function Virtualization (NFV), which may provide a virtualized environment able to provide any network function or service able to be delivered on general purpose computing systems in a data center as software applications called Virtual Network Functions (VNFs) in conjunction with other network functions (NFs). The use of NFV may provide flexibility in configuring network objects, enabling dynamic network optimization and quicker adaptation of new technologies. As NR systems develop, flexibility in determining performance management of such systems, including management data analytical key performance indicators (KPIs) is also to be developed.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
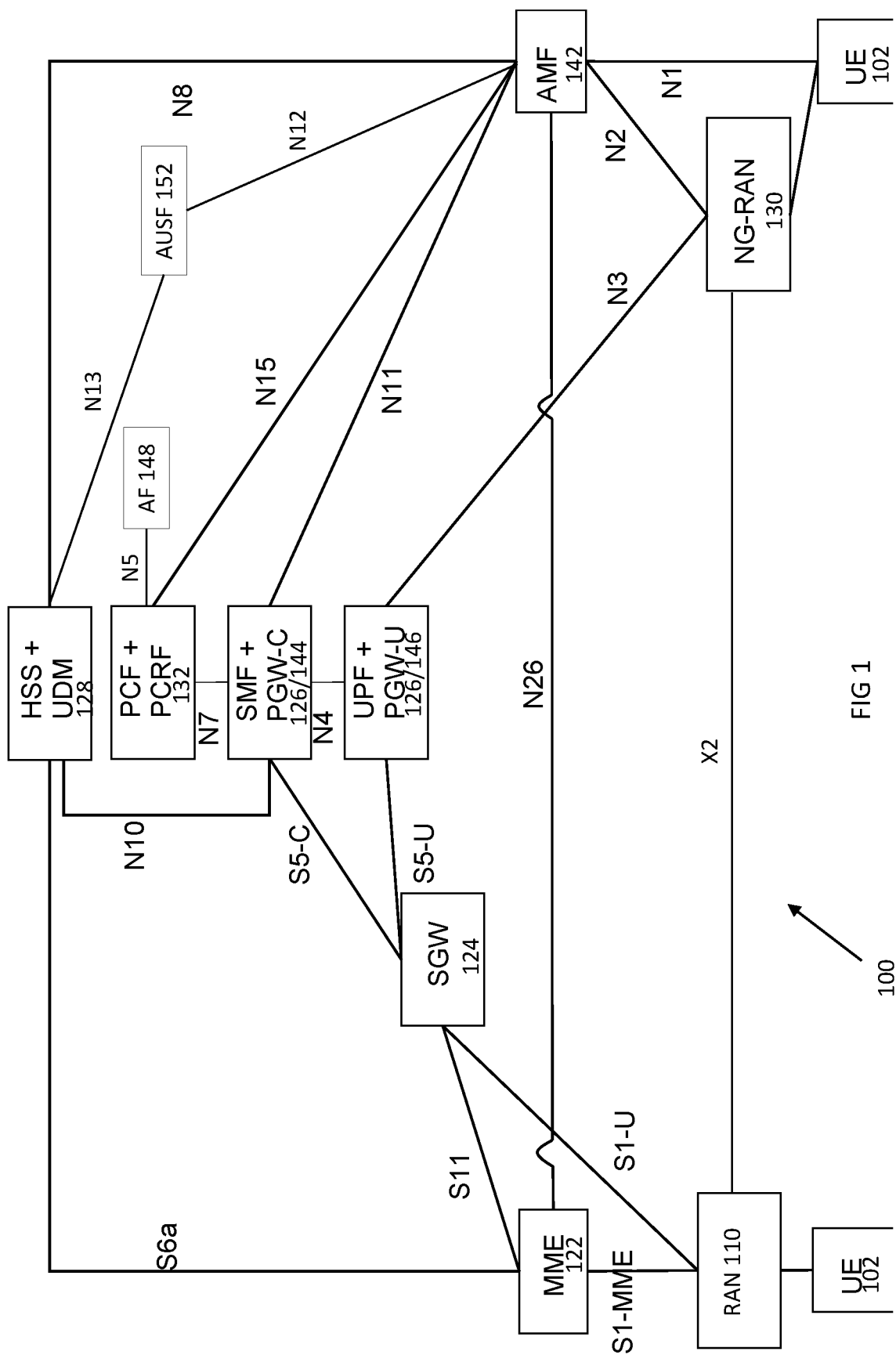
FIG. 1 illustrates combined communication system in accordance with some embodiments.

FIG. 1 illustrates a combined communication system in accordance with some embodiments. The system 100 includes 3GPP LTE/4G and NG network functions. A network function can be implemented as a discrete network object on a dedicated hardware, as a software instance running on dedicated hardware, or as a virtualized function instantiated on an appropriate platform, e.g., dedicated hardware or a cloud infrastructure.

The evolved packet core (EPC) of the LTE/4G network contains protocol and reference points defined for each entity. These core network (CN) entities may include a mobility management entity (MME) 122, serving gateway (S-GW) 124, and paging gateway (P-GW) 126.

In the NG network, the control plane and the user plane may be separated, which may permit independent scaling and distribution of the resources of each plane. The UE 102 may be connected to either an access network or random access network (RAN) 110 and/or may be connected to the NG-RAN 130 (gNB) or an Access and Mobility Function (AMF) 142. The RAN may be an eNB, a gNB or a general non-3GPP access point, such as that for Wi-Fi. The NG core network may contain multiple network functions besides the AMF 112. The network functions may include a User Plane Function (UPF) 146, a Session Management Function (SMF) 144, a Policy Control Function (PCF) 132, an Application Function (AF) 148, an Authentication Server Function (AUSF) 152 and User Data Management (UDM) 128. The various elements are connected by the NG reference points shown in FIG. 1.

The AMF 142 may provide UE-based authentication, authorization, mobility management, etc. The AMF 142 may be independent of the access technologies. The SMF 144 may be responsible for session management and allocation of IP addresses to the UE 102. The SMF 144 may also select and control the UPF 146 for data transfer. The SMF 144 may be associated with a single session of the UE 102 or multiple sessions of the UE 102. This is to say that the UE 102 may have multiple 5G sessions. Different SMFs may be allocated to each session. The use of different SMFs may permit each session to be individually managed. As a consequence, the functionalities of each session may be independent of each other. The UPF 126 may be connected with a data network, with which the UE 102 may communicate, the UE 102 transmitting uplink data to or receiving downlink data from the data network.

The AF 148 may provide information on the packet flow to the PCF 132 responsible for policy control to support a desired QoS. The PCF 132 may set mobility and session management policies for the UE 102. To this end, the PCF 132 may use the packet flow information to determine the appropriate policies for proper operation of the AMF 142 and SMF 144. The AUSF 152 may store data for UE authentication. The UDM 128 may similarly store the UE subscription data.

The gNB 130 may be a standalone gNB or a non-standalone gNB, e.g., operating in Dual Connectivity (DC) mode as a booster controlled by the eNB 110 through an X2 or Xn interface. At least some of functionality of the EPC and the NG CN may be shared (alternatively, separate components may be used for each of the combined component shown). The eNB 110 may be connected with an MME 122 of the EPC through an S1 interface and with a SGW 124 of the EPC 120 through an S1-U interface. The MME 122 may be connected with an HSS 128 through an S6a interface while the UDM is connected to the AMF 142 through the N8 interface. The SGW 124 may connected with the PGW 126 through an S5 interface (control plane PGW-C through S5-C and user plane PGW-U through S5-U). The PGW 126 may serve as an IP anchor for data through the internet.

The NG CN, as above, may contain an AMF 142, SMF 144 and UPF 146, among others. The eNB 110 and gNB 130 may communicate data with the SGW 124 of the EPC 120 and the UPF 146 of the NG CN. The MME 122 and the AMF 142 may be connected via the N26 interface to provide control information there between, if the N26 interface is supported by the EPC 120. In some embodiments, when the gNB 130 is a standalone gNB, the 5G CN and the EPC 120 may be connected via the N26 interface.

Figure 2:
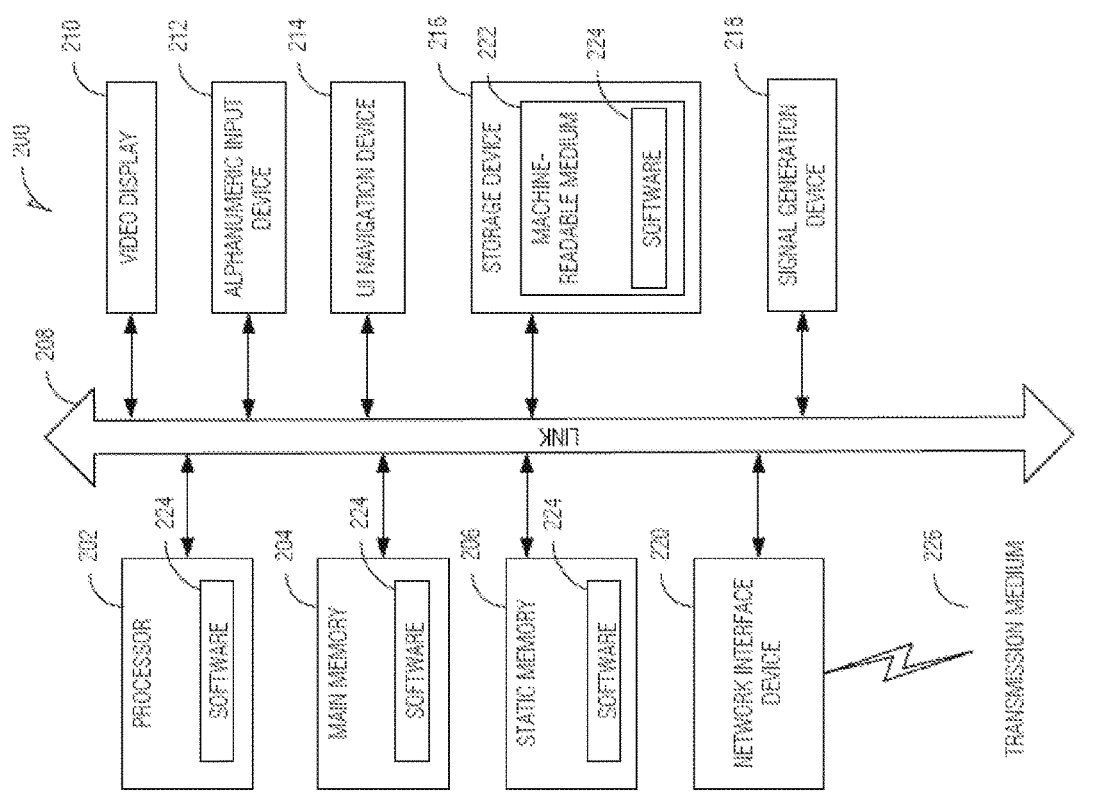
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIG. 1.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/$5^{th}$ generation (5G) standards among others. In an example, the network interface device 220 may include one or more physical jacks (e.g., Ethernet, coaxial, or phone jacks) or one or more antennas to connect to the transmission medium 226.

Figure 3:
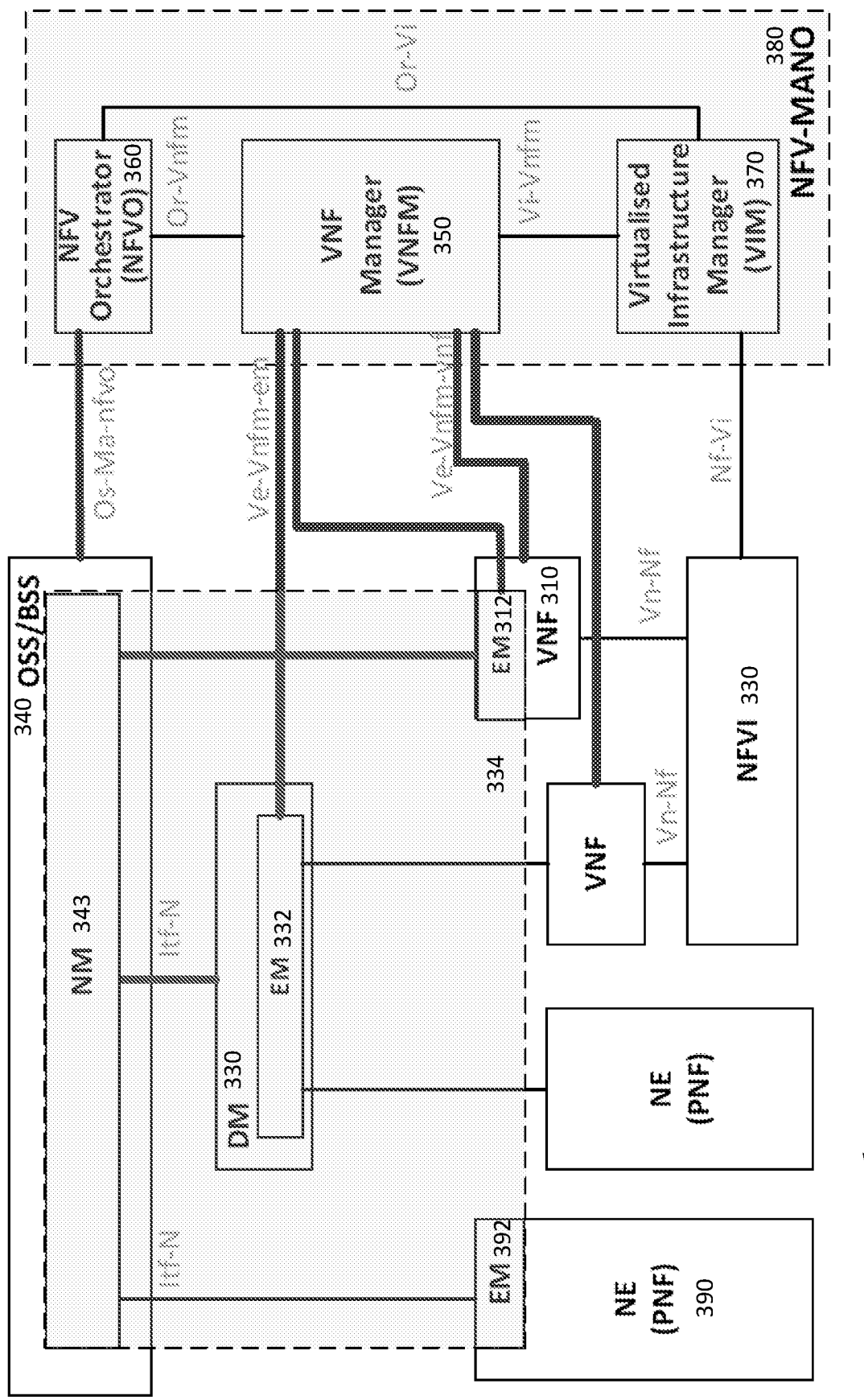
FIG. 3 illustrates an NFV network management architecture in accordance with some embodiments.

FIG. 3 illustrates an NFV network management architecture in accordance with some embodiments. As illustrated, the NFV network management architecture 300 may include a number of elements (each of which may contain physical and/or virtualized components), including a Network Virtualization Function Infrastructure (NFVI) 310, Network elements (NEs) 390, Virtual Network Functions (VNFs) 320, a Domain Manager (DM) 330, an Element Manager (EM) 332, a Network Manager (NM) 342, and an NFV Management and Orchestration (NFV-MANO) 380. The NFV-MANO 380, which may be replaced as indicated herein by multiple NFV-MANO, may comprise a Virtualized Infrastructure Manager (VIM) 340, a VNF Manager (VNFM) 350, and a Network Function. Virtualization Orchestrator (NFVO) 360. The NM 342 may be contained in an Operations Support System/Business Support System (OSS/BSS) 320, with the DM 330 and NM 342 forming the 3GPP management system 314.

The NFV network management architecture 300 may be implemented by, for example, a data center comprising one or more servers in the cloud. The NFV network management architecture 300, in some embodiments, may include one or more physical devices and/or one or more applications hosted on a distributed computing platform, a cloud computing platform, a centralized hardware system, a server, a computing device, and/or an external network-to-network interface device, among others. In some cases, the virtualized resource performance measurement may include, for example, latency, jitter, bandwidth, packet loss, nodal connectivity, compute, network, and/or storage resources, accounting, fault and/or security measurements. In particular, the NEs 390 may comprise physical network functions (PNF) including both hardware such as processors, antennas, amplifiers, transmit and receive chains, as well as software. The VNFs 320 may be instantiated in one or more servers. Each of the VNFs 320, DM 330 and the NEs 390 may contain an EM 322, 332, 392.

The NFV Management and Orchestration (NFV-MANO) 380 may manage the NFVI 310. The NFV-MANO 380 may orchestrate the instantiation of network services, and the allocation of resources used by the VNFs 320. The NFV-MANO 380 may, along with the OSS/BSS 340, be used by external entities to deliver various NFV business benefits.

The OSS/BSS 340 may include the collection of systems and management applications that a service provider may use to operate their business: management of customers, ordering, products and revenues—for example, payment or account transactions, as well as telecommunications network components and supporting processes including network component configuration, network service provisioning and fault handling. The NFV-MANO 380 may create or terminate a VNF 320, increase or decrease the VNF capacity, or update or upgrade software and/or configuration of a VNF. The NFV-MANO 380 may include a Virtualized Infrastructure Manager (VIM) 370, a VNF Manager (VNFM) 350 and a NFV Orchestrator (NFVO) 360. The NFV-MANO 380 may have access to various data repositories including network services, VNFs available, NFV instances and NFVI resources with which to determine resource allocation.

The VIM 370 may control and manage the NFVI resources via Nf-Vi reference points within the infrastructure sub-domain. The VIM 370 may further collect and forward performance measurements and events to the VNFM 350 via Vi-VNFM and to the NFVO 360 via Or-Vi reference points. The NFVO 360 may be responsible for managing new VNFs and other network services, including lifecycle management of different network services, which may include VNF instances, global resource management, validation and authorization of NFVI resource requests and policy management for various network services. The NFVO 360 may coordinate VNFs 320 as part of network services that jointly realize a more complex function, including joint instantiation and configuration, configuring required connections between different VNFs 320, and managing dynamic changes of the configuration. The NFVO 360 may provide this orchestration through an OS-Ma-NFVO reference point with the NM 342. The VNFM 350 may orchestrate NFVI resources via the VIM 370 and provide overall coordination and adaptation for configuration and event reporting between the VIM 320 and the EMs and NMs. The former may involve discovering available services, managing virtualized resource availability/allocation/release and providing virtualized resource fault/performance management. The latter may involve lifecycle management that may include instantiating a VNF, scaling and updating the VNF instances, and terminating the network service, releasing the NFVI resources for the service to the NFVI resource pool to be used by other services.

The VNFM 350 may be responsible for the lifecycle management of the VNFs 320 via the Ve-VNFM-VNF reference point and may interface to EMs 322, 332 through the Ve-VNFM—EM reference point. The VNFM 350 may be assigned the management of a single VNF 320, or the management of multiple VNFs 320 of the same type or of different types. Thus, although only one VNFM 350 is shown in FIG. 3, different VNFMs 350 may be associated with the different VNFs 320 for performance measurement and other responsibilities. The VNFM 350 may provide a number of VNF functionalities, including instantiation (and configuration if required by the VNF deployment template), software update/upgrade, modification, scaling out/in and up/down, collection of NFVI performance measurement results and faults/events information and correlation to VNF instance-related events/faults, healing, termination, lifecycle management change notification, integrity management, and event reporting.

The VIM 370 may be responsible for controlling and managing the NFVI compute, storage and network resources, usually within one operator's Infrastructure Domain. The VIM 370 may be specialized in handling a certain type of NFVI resource (e.g. compute-only, storage-only, networking-only), or may be capable of managing multiple types of NFVI resources. The VIM 370 may, among others, orchestrate the allocation/upgrade/release/reclamation of NFVI resources (including the optimization of such resources usage) and manage the association of the virtualized resources to the physical compute, storage, networking resources, and manage repository inventory-related information of NFVI hardware resources (compute, storage, networking) and software resources (e.g. hypervisors), and discovery of the capabilities and features (e.g. related to usage optimization) of such resources.

The NFVI 310 may itself contain various virtualized and non-virtualized resources. These may include a plurality of virtual machines (VMs) 312 that may provide computational abilities (CPU), one or more memories 314 that may provide storage at either block or file-system level and one or more networking elements 316 that may include networks, subnets, ports, addresses, links and forwarding rules to ensure intra- and inter-VNF connectivity.

Each VNF 320 may provide a network function that is decoupled from infrastructure resources (computational resources, networking resources, memory) used to provide the network function. Although not shown, the VNFs 320 can be chained with other VNFs 320 and/or other physical network function to realize a network service. The virtualized resources may provide the VNFs 320 with desired resources. Resource allocation in the NFVI 310 may simultaneously meet numerous requirements and constraints, such as low latency or high bandwidth links to other communication endpoints.

The VNFs 320, like the NEs 390 may be managed by one or more EMs 322, 332, 392. The EM may provide functions for management of virtual or physical network elements, depending on the instantiation. The EM may manage individual network elements and network elements of a sub-network, which may include relations between the network elements. For example, the EM 322 of a VNF 320 may be responsible for configuration for the network functions provided by a VNF 320, fault management for the network functions provided by the VNF 320, accounting for the usage of VNF functions, and collecting performance measurement results for the functions provided by the VNF 320.

The EMs 322, 332, 392 (whether in a VNF 320 or NE 390) may be managed by the NM 342 of the OSS/BSS 340 through Itf-N reference points. The NM 342 may provide functions with the responsibility for the management of a network, mainly as supported by the EM 332 but may also involve direct access to the network elements. The NM 342 may connect and disconnect VNF external interfaces to physical network function interfaces at the request of the NFVO 360.

As above, the various components of the system may be connected through different reference points. The references points between the NFV-MANO 380 and the functional blocks of the system may include an Os-Ma-NFVO between the NM 342 and NFVO 360, a Ve-VNFM-EM between the EM 322, 332 and the VNFM 350, a Ve-VNFM-VNF between a VNF 320 and the VNFM 350, a Nf-Vi between the NFVI 310 and the VIM 370, an Or-VNFM between the NFVO 360 and the VNFM 350, an Or-Vi between the NFVO 360 and the VIM 370, and a Vi-VNFM between the VIM 370 and the VNFM 350. An Or-Vi interface may implement the VNF software image management interface and interfaces for the management of virtualized resources, their catalogue, performance and failure on the Or-Vi reference point. An Or-Vnfm interface may implement a virtualized resource management interface on the Or-Vnfm reference point. A Ve-Vnfm interface may implement a virtualized resource performance/fault management on the Ve-Vnfm reference point.

As above, with the advent of 5G networks and disparate devices (such as Machine Type Communication (MTC), enhanced Mobile Broadband (eMBB) and Ultra-Reliable and Low Latency Communications (URLLC) devices) using these networks, network management and network slicing is evolving towards a service based architecture in which virtualization is used. To provide network management and slicing, network provisioning and resource management, fault supervision, performance management (PM) and reporting, and management data analytics.

Network slicing is a form of virtualization that allows multiple virtual networks to run on top of a common shared physical network infrastructure. Network slicing serves service requirements by providing isolation between network resources, as well as permitting an optimized topology and specific configuration to be developed for each Network Slice Instance (NSI). The different parts of an NSI may be grouped as Network Slice Subnets that allow the lifecycle of a Network Slice Subnet Instance (NSSI) to be managed independently from the lifecycle of an NSI. The NSSIs may be implemented as different core networks, such RAN and 5GC.

Figure 4:
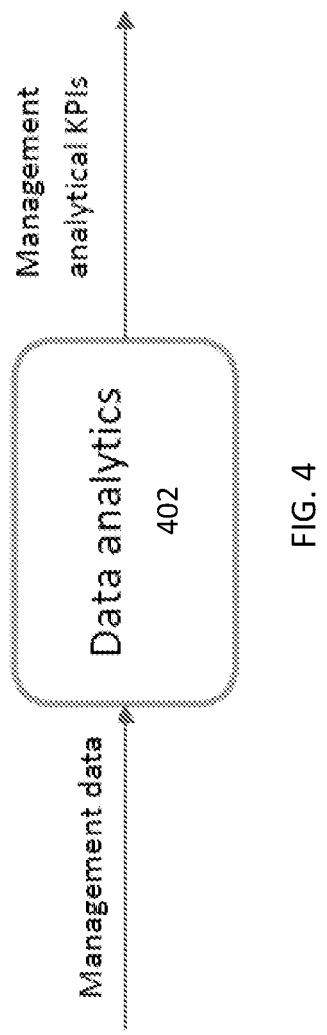
FIG. 4 illustrates production of management analytical key performance indicators (KPIs) in accordance with some embodiments.

As above, a Management Data Analytics Service has been introduced to analyze the raw performance data of NFs of the network. The performance data can be analyzed, together with other management data (e.g., alarm information, configuration data), and formed into management analytical data for NFs, NSSIs, NSIs, sub-networks or networks. FIG. 4 illustrates production of management analytical key performance indicators (KPIs) in accordance with some embodiments. As shown, the management data analytics service producer 402, which may be implemented in software or may be specialized hardware, analyzes the management data and provides the management data analytical KPIs.

The management analytical data can be used to diagnose ongoing issues impacting the performance of the network and predict potential issues (e.g., potential failure and/or performance degradation). For example, the analysis of NSI/NSSI resource usage can form a management analytical data indicating whether a certain resource is deteriorating. The analysis and correlation of the overall performance data of network may indicate an overload situation and potential failure(s).

Figure 5:
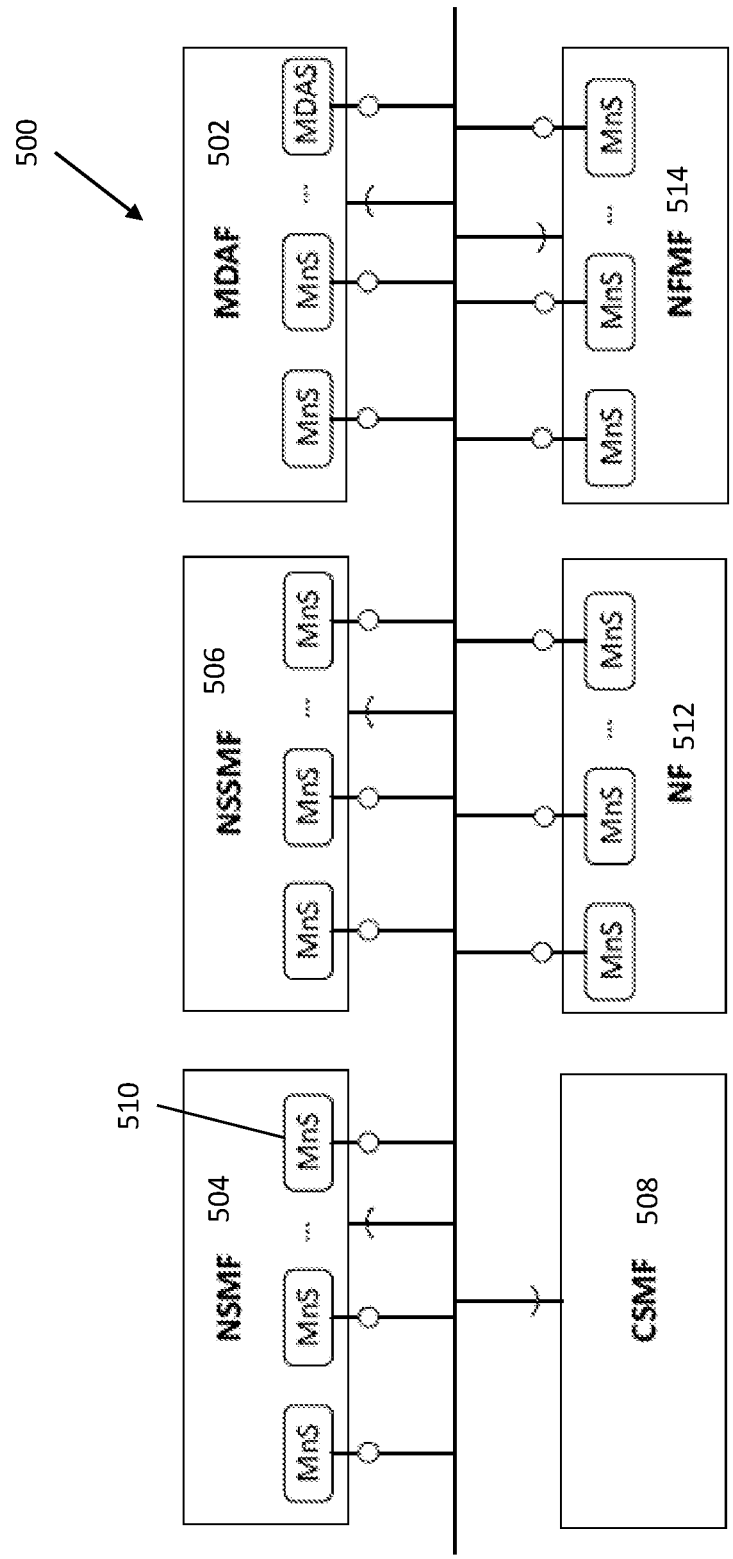
FIG. 5 illustrates a management data analytics service in accordance with some embodiments.

FIG. 5 illustrates a management data analytics service in accordance with some embodiments. The management data analytics service (MDAS) 500 may be provided by the management data analytics function (MDAF) 502, whether real or virtual, and consumed by other management functions, also whether real or virtual. The management data analytical KPIs may be used for prediction of traffic volume, resource utilization tendency, and indication of the RAN/5GC condition (e.g., load level of one or more gNBs or other network components). The management data analytics utilize the network management data collected from the network (including e.g. service, slicing and/or network functions-related data) and provides the corresponding analytics based on the collected information. The MDAS 500 can be deployed at different levels, for example, at a domain level (e.g., RAN, CN, NSSI) and/or in a centralized manner (e.g., at a public land mobile network (PLMN) level). A domain-level MDAS provides domain specific analytics, e.g., resource usage prediction in a CN or failure prediction in a NSSI, etc. A centralized MDAS can provide end-to-end or cross-domain analytics service, e.g., resource usage or failure prediction in an NSI, optimal CN node placement for ensuring lowest latency in the connected RAN, etc. For example, a domain MDAF produces a domain MDAS, which is consumed by a centralized MDAF and other authorized MDAS consumers (for example, infrastructure manager, network manager, slice manager, slice subnet manger, other 3rd party OSS, etc.). A centralized MDAF produces a centralized MDAS, which is consumed by different authorized MDAS consumers.

The MDAS 500 provides data analytics of different network related parameters including for example load level and/or resource utilization. For example, the MDAS for a NF can collect the NF's load related performance data, e.g., resource usage status of the NF. The analysis of the collected data may provide forecast of resource usage information in a predefined future time. This analysis may also recommend appropriate actions e.g., scaling of resources, admission control, load balancing of traffic, etc.

The MDAS for a NSSI provides NSSI related data analytics. The service may consume the corresponding MDAS of its constituent NFs. The NSSI MDAS may further classify or shape the data in different useful categories and analyze the data for different network slice subnet management needs (e.g., scaling, admission control of the constituent NFs etc.). If an NSSI is composed of multiple other NSSIs, the NSSI MDAS acts as a consumer of MDAS of the constituent NSSIs for further analysis e.g., resource usage prediction, failure prediction for an NSSI, etc.

A MDAS for an NSI provides NSI related data analytics. The service may consume the corresponding MDAS of its constituent NSSI(s). The NSI MDAS may further classify or shape the data in different useful categories according to different customer needs, e.g., slice load, constituent NSSI load, communication service loads. This data can be used for further analysis e.g., resource usage prediction, failure prediction for an NSI, etc.

Each of the network slice management function (NSMF) 504, network slice subnet management function (NSSMF) 506, communication service management function (CSMF) 508, exposure governance management function (EGMF) 512, network function management function (NFMF) 514 shown in FIG. 5 may contain one or more management services (MnS) 510.

The NSMF 504 provides the management services for managing one or more NF(s) 512. The NSMF 504 may consume some management services produced by other functional blocks.

The NF 512 provides management services, for example NF performance management services, NF configuration management services and NF fault supervision services.

The NSSMF 506 provides the management services for one or more NSSI. The NSSMF 506 may consume management services produced by other functional blocks.

The NSMF 504 provides the management services for one or more NSI. The NSMF 504 may consume management services produced by other functional blocks.

The MDAF 502 provides the Management Data Analytics Service for one or more NF, NSSI and/or NSI. The MDAF 502 may consume management services produced by other functional blocks.

The CSMF 508 consumes the management service(s) provided by the other functional blocks. This deployment example does not illustrate what management services the CSMF consumes.

The EGMF 514 provides management service(s) with applied exposure governance and a management service with management capability exposure governance to one or more management service consumers. The EGMF 514 may consume management services produced by other functional blocks.

The MDAS 500 may, as above, have a number of use cases. For example, one use case is for user traffic volume prediction KPIs. The user traffic of the NR network may be delivered to the end users. The network may be designed, maintained and operated to adapt to volume of user data traffic. The volume of user data traffic may be supported by the suitable network configurations (e.g., capacity) and network resources (such as NFs, VRs, VLs, etc.). The ideal and optimal situation is that the network configurations and allocated resources are just enough, but not too excessive, to support the volume of the user data traffic. Since the volume of user traffic may vary from period to period, the prediction of the user traffic volume for the upcoming period is useful for the network configurations and resource allocations. With the predicated user traffic volume, proper preventative actions may be taken to make the network better adapt to the user traffic.

Accordingly, a first KPI is the predicted downlink (DL) user traffic volume for a NF, NSSI, NSI, subnetwork or network. The KPI may be limited to the predicted DL user traffic volume for a predetermined upcoming period. The period may be the next period after the current period (e.g., an hour, same day next week, etc. . . . ) or may be a period separated from the current period by one or more intervening periods. The KPI may be derived from analytics of the current and historical performance measurements directly and/or indirectly related to DL user data traffic volume. The historical performance may be of a period immediately previous to the current period or one or more periods prior to the current period.

Figure 6:
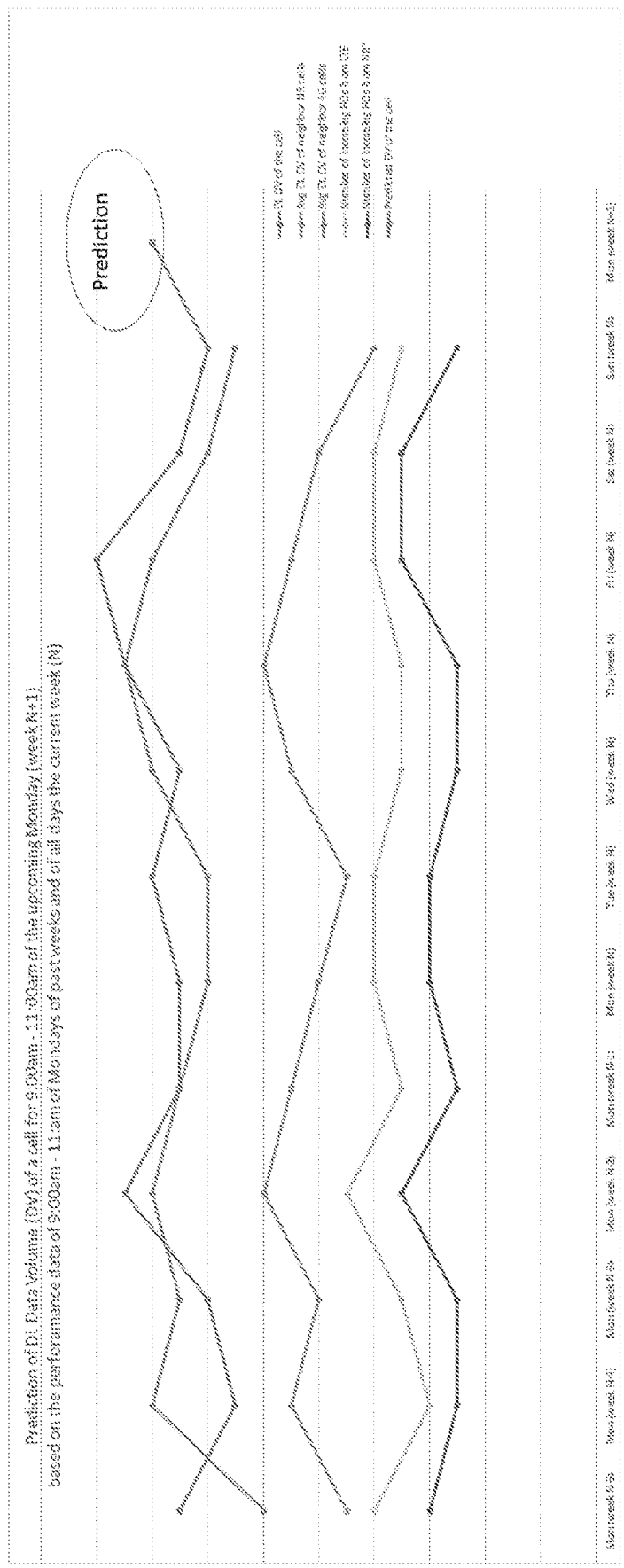
FIG. 6 illustrates a graph of a simulated downlink data volume prediction in accordance with some embodiments.

The prediction algorithm for deriving this KPI may use implementation-related performance measurements. FIG. 6 illustrates a graph of a simulated downlink data volume prediction in accordance with some embodiments. As shown, data inputs for downlink data volume prediction may include multiple inputs for multiple different days. The inputs may include one or more of: DL data volume of the cell for which data volume is to be predicted, the average DL data volume of one or more neighbor NR cells, the average DL data volume of one or more neighbor LTE cells, the number of incoming handovers from one or more NR cells, and the number of incoming handovers from one or more LTE cells. In particular, the DL data volume for a particular period, as shown a 2 hour time period of the next Monday, may use the inputs of DL data volume for the same time period of each Monday for several previous weeks, as well as DL data volume for the same time period of other days of the present week.

Another KPI is the predicted uplink (UL) user traffic volume for a NF, NSSI, NSI, subnetwork or network. The KPI may be limited to the predicted UL user traffic volume for a predetermined upcoming period. The period may be the next period after the current period or may be a period separated from the current period by one or more intervening periods. The KPI may be derived from analytics of the current and historical performance measurements directly and/or indirectly related to UL user data traffic volume. The measurements, similar to the above, may include one or more of: uplink data volume of a cell for which the uplink data volume is to be predicted, average uplink data volume of at least one neighbor NR cell, average uplink data volume of at least neighbor Long Term Evolution (LTE) cells, a number of incoming handovers from the at least one NR cell, and a number of incoming handovers from the at least one LTE cell. The historical performance may be of a period immediately previous to the current period or one or more periods prior to the current period. The prediction algorithm for deriving this KPI may use implementation-related performance measurements.

Another KPI is the utilization of the underlying resources. The performance of the 5G network may be directly impacted by the utilization of the underlying resources. Resource shortage downgrades or even deteriorates the performance of the 5G network and could further impact the quality of experience (QoE) of the end users. On the other hand, resource excess increases capital expenditure (CAPEX) and operating expenses (OPEX) for the operator. Thus, keeping the resource allocation in an efficient and reasonable range is desirable for the operator, which can be more probably achieved when the resource utilization tendency can be known.

The resource utilization tendency can be indicated by resource shortage probability and resource excess probability. The resource shortage probability and resource excess probability KPIs can be derived from the analytics of current and historical performance data about the resource allocation, resource utilization, number of users, traffic volume, etc., for the NF, NSSI, NSI, subnetwork or the network. With the resource shortage probability KPI, preventative actions can be taken to avoid service failures caused by resource shortage. With the resource excess probability KPI, excessive resources may be reclaimed to save the CAPEX and OPEX.

Figure 7:
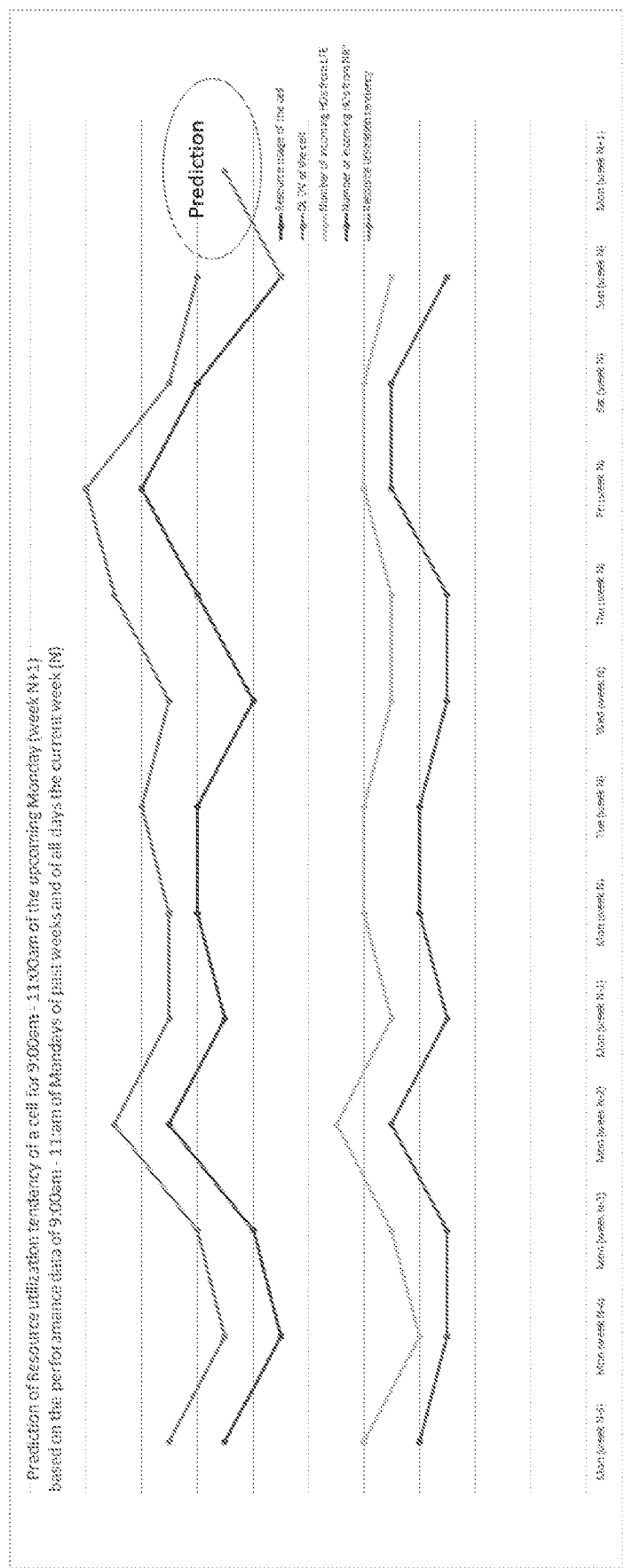
FIG. 7 illustrates a graph of a simulated resource use prediction in accordance with some embodiments.

FIG. 7 illustrates a graph of a simulated resource use prediction in accordance with some embodiments. As shown, data inputs for resource utilization prediction may include multiple inputs for multiple different days. These inputs may be the same as those described for FIG. 6 or may be different. For example, the inputs for resource utilization prediction may include one or more of: resource usage of the cell for which resource utilization is to be predicted, the DL data volume of the cell, the number of incoming handovers from one or more NR cells, and the number of incoming handovers from one or more LTE cells. Like FIG. 6, the resource use for a particular period, as shown a 2 hour time period of the next Monday, may use the inputs of DL data volume for the same time period of each Monday for several previous weeks, as well as DL data volume for the same time period of other days of the present week. Note that in FIG. 7, like FIG. 6, the length of time of the future period may be different than 2 hours and the performance data may be for one or more periods during the same day or a previous day, rather than using data from weeks beforehand.

Resource utilization tendency may be indicated by resource shortage probability and resource excess probability. The former is the probability of resource shortage for a NF, NSSI, NSI, subnetwork or network. The resources can include Virtualized Resource(s) (VR) and/or physical resource(s). The KPI may provide a number of bins that indicate the percentage of probability of resources that are short. For example, a KPI at bin 30 may indicate a probably of shortage of 30% of the available resources. As above the resource utilization KPI may derived from the analytics of the current and historical performance measurements directly and/or indirectly related to resource utilization. The prediction algorithm for deriving this KPI may use implementation-related performance measurements. Once predicted, additional physical or virtual resources may be allocated sufficiently in advance for the resource (NF, NSSI, NSI, subnetwork or network) to alleviate the shortfall. For example, if a shortfall of resources is predicted by the management analytical KPI(s), the desired resources may be assigned (if physical or virtual) or created (if virtual) by a manager.

Similarly, the resource excess probability is the probability of resource excess for a NF, NSSI, NSI, subnetwork or network. The resources can include Virtualized Resource(s) (VR) and/or physical resource(s). The KPI may provide a number of bins that indicate the percentage of probability of resources that are in excess. For example, a KPI at bin 30 may indicate a probably of excess of 30% of the available resources (each bin may indicate a different 1%, although other amounts may be used, e.g., 2% or 0.5%, dependent, for example on granularity desired and resource capacity available). As above the resource utilization KPI may derived from the analytics of the current and historical performance measurements directly and/or indirectly related to resource utilization. The prediction algorithm for deriving this KPI may use implementation-related performance measurements. Once predicted, additional physical or virtual resources may be eliminated or used for resources that are predicted to be short sufficiently in advance to alleviate the excess for the resource (NF, NSSI, NSI, subnetwork or network).

In general, to enable an authorized consumer to collect management analytical data for NSIs/NSSIs, various elements may be used. The elements may include a producer of a MDAS; a producer of a measurement job control service for a NSI(s); a producer of a measurement job control service for a NSSI(s); a producer of a measurement job control service for a NF(s); a producer of a performance data file reporting service or streaming service for NSI(s); a producer of a performance data file reporting service or streaming service for NSSI(s); and a producer of a performance data file reporting service or streaming service for NF(s). The MDAS may determine what performance measurements of NSI(s), NSSI(s) and NF(s) are to be used to generate the subject management analytical data. The MDAS may check whether the NSI performance measurements can be collected by an existing measurement job(s) for NSI(s), NSSI(s) and NF(s). If a new measurement job(s) for the NSI(s) is to be created, the MDAS producer may consume the NSI measurement job control service to create the new measurement job(s) for the NSI(s). If a new measurement job(s) for the NSSI(s) is to be created, the MDAS producer may consume the NSSI measurement job control service to create the new measurement job(s) for the NSSI(s). If a new measurement job(s) for the NF(s) is to be created, the MDAS producer may consume the NF measurement job control service to create the new measurement job(s) for the NF(s). The MDAS producer may consume the performance data reporting-related services to obtain the performance measurements for NSI(s), NSSI(s) and NF(s), generate the management analytical data based on the collected performance measurements, and make the management analytical data available to the management service responsible for reporting the data.

Similarly, to enable an authorized consumer to collect management analytical data for the network, various elements may be used. The elements may include a producer of a MDAS; a producer of a measurement job control service for NF(s); and a producer of a performance data file reporting service or streaming service for NF(s). The MDAS may determine what performance measurements of NF(s) are to be used to generate the subject network management analytical data. The MDAS may check whether the network performance measurements can be collected by an existing measurement job(s) for the NF(s). If a new measurement job(s) for the NF(s) is to be created, the MDAS producer may consume the NF measurement job control service to create the new measurement job(s) for the NF(s). The MDAS producer may consume the performance data reporting-related services to obtain the performance measurements for the NF(s) and generate the management analytical KPIs based on the collected performance measurements. The management analytical data may be available to the management service responsible for reporting the data to the consumer.

EXAMPLES

Example 1 is an apparatus of a management data analytics service producer in a fifth generation (5G) network, the apparatus comprising: processing circuitry arranged to: determine physical resources and virtual resources of network functions (NFs) in the 5G network; receive a request for a management data analytical key performance indicator (KPI) from a consumer; collect performance data of a network object in the 5G network for a past period, the network object comprising at least one of the NFs; generate management analytical data based on the collected performance data; determine the KPI for a future period related to the past period, the KPI to predict one of: uplink or downlink traffic volume or resource utilization associated with the network object; and report the KPI to the consumer for adjustment of resources in the 5G network based on the KPI or to trigger an alarm to indicate that the resources in the 5G network are to be adjusted based on the KPI; and a memory arranged to store the KPI.

In Example 2, the subject matter of Example 1 includes, wherein the processing circuitry is further configured to: determine, from the request, from which of a plurality of network objects to collect the performance measurements to generate the management analytical data, the network objects comprising a Network Function (NF), a Network Slice Instance (NSI), a Network Slice Subnet Instance (NSSI), a subnetwork or the 5G network.

In Example 3, the subject matter of Example 2 includes, wherein the processing circuitry is further configured to: if the network objects comprise the NF, determine whether the performance measurements can be collected by an existing NF measurement job, and if a new NF measurement job for the NF is to be created, create the new NF measurement job, if the network objects comprise the NSI, determine whether the performance measurements can be collected by an existing NSI measurement job for NFs associated with the NSI, and if a new NSI measurement job for the NFs associated with the NSI is to be created, create the NSI new measurement job, and if the network objects comprise the NSSI, determine whether the NSSI performance measurements can be collected by an existing NSSI measurement job for NFs associated with the NSSI, and if a new NSSI measurement job for the NFs associated with the NSSI is to be created, create the new NSSI measurement job.

In Example 4, the subject matter of Examples 2-3 includes, wherein the processing circuitry is further configured to: report a recommendation to take an action based on the KPI, the action comprising at least one of scaling of resources, admission control, or load balancing of traffic for the network object.

In Example 5, the subject matter of Example 4 includes, wherein the processing circuitry is further configured to: if the network objects comprise further constituent network objects, report a recommendation to take an action on the constituent network objects based on the KPI, the action comprising at least one of scaling of resources, admission control, or load balancing of traffic for at least one of the constituent network objects.

In Example 6, the subject matter of Examples 1-5 includes, wherein the management data analytics service producer is a management data analytics function (MDAF).

In Example 7, the subject matter of Examples 1-6 includes, wherein the processing circuitry is further configured to: if the KPI is predicted resource utilization associated with the network object, bin the resource utilization by probability of resource shortage or excess, each bin indicating a percentage of the resources that are short or in excess.

In Example 8, the subject matter of Examples 1-7 includes, wherein: each bin indicates a different 1% percentage of the resources that are short or in excess.

In Example 9, the subject matter of Examples 1-8 includes, wherein the processing circuitry is further configured to: if the KPI is predicted downlink traffic volume associated with the network object, collect as the performance data: downlink data volume of a cell for which the downlink data volume is to be predicted, average downlink data volume of at least one neighbor NR cell, average downlink data volume of at least neighbor Long Term Evolution (LTE) cells, a number of incoming handovers from the at least one NR cell, and a number of incoming handovers from the at least one LTE cell.

In Example 10, the subject matter of Examples 1-9 includes, wherein the processing circuitry is further configured to: if the KPI is predicted uplink traffic volume associated with the network object, collect as the performance data: uplink data volume of a cell for which the uplink data volume is to be predicted, average uplink data volume of at least one neighbor NR cell, average uplink data volume of at least neighbor Long Term Evolution (LTE) cells, a number of incoming handovers from the at least one NR cell, and a number of incoming handovers from the at least one LTE cell.

In Example 11, the subject matter of Examples 1-10 includes, wherein the processing circuitry is further configured to: determine that the future period is an upcoming limited time period of a day of a current week, and collect as the performance data multiple sets of performance data from a limited time period of a day of at least one previous week that corresponds to the upcoming limited time period of the day of the current week.

Example 12 is a computer-readable storage medium that stores instructions for execution by one or more processors of a management data analytics service producer in a fifth generation (5G) network, the instructions when executed configure the one or more processors of the management data analytics service producer to: determine physical and virtual resources of network functions (NFs) in an 5G network; receive a request for a management data analytical key performance indicator (KPI) from a consumer; determine that performance measurements to determine the KPI are unable to be collected by an existing measurement job and create a new measurement job; collect performance data of a network object in the 5G network for a past period using the measurement job, the network object comprising at least one of the NFs; generate management analytical data based on the collected performance data; determine the management data analytical KPI for a future period that corresponds with the past period, the management data analytical KPI to predict uplink or downlink traffic volume or resource utilization associated with the network object; and report the KPI to the consumer for adjustment of resources in the network based on the management data analytical KPI or to trigger an alarm to indicate that the resources in the NR network are to be adjusted based on the management data analytical KPI.

In Example 13, the subject matter of Example 12 includes, wherein the instructions when executed further configure the one or more processors of the management data analytics service producer to: determine, from the request, from which of a plurality of network objects to collect the performance measurements to generate the management analytical data, the network objects comprising a Network Function (NF), a Network Slice Instance (NSI), a Network Slice Subnet Instance (NSSI), a subnetwork or the 5G network, and report a recommendation to take an action based on the KPI, the action comprising at least one of scaling of resources, admission control, or load balancing of traffic for the network object.

In Example 14, the subject matter of Examples 12-13 includes, wherein the instructions when executed further configure the one or more processors of the management data analytics service producer to: determine, from the request, from which of a plurality of network objects to collect the performance measurements to generate the management analytical data, the network objects comprising a Network Function (NF), a Network Slice Instance (NSI), a Network Slice Subnet Instance (NSSI), a subnetwork or the 5G network, and if the network object comprises further constituent network objects, report a recommendation to take an action on the constituent network objects based on the KPI, the action comprising at least one of scaling of resources, admission control, or load balancing of traffic for at least one of the constituent network objects.

In Example 15, the subject matter of Examples 12-14 includes, wherein the instructions when executed further configure the one or more processors of the management data analytics service producer to: determine, from the request, from which of a plurality of network objects to collect the performance measurements to generate the management analytical data, the network objects comprising a Network Function (NF), a Network Slice Instance (NSI), a Network Slice Subnet Instance (NSSI), a subnetwork or the 5G network, and if the KPI is predicted resource utilization associated with the network object, bin the resource utilization by probability of resource shortage or excess, each bin indicating a percentage of the resources that are short or in excess.

In Example 16, the subject matter of Examples 12-15 includes, wherein the instructions when executed further configure the one or more processors of the management data analytics service producer to: determine, from the request, from which of a plurality of network objects to collect the performance measurements to generate the management analytical data, the network objects comprising a Network Function (NF), a Network Slice Instance (NSI), a Network Slice Subnet Instance (NSSI), a subnetwork or the 5G network, and if the KPI is predicted downlink traffic volume associated with the network object, collect as the performance data: downlink data volume of a cell for which the downlink data volume is to be predicted, average downlink data volume of at least one neighbor NR cell, average downlink data volume of at least neighbor Long Term Evolution (LTE) cells, a number of incoming handovers from the at least one NR cell, and a number of incoming handovers from the at least one LTE cell.

In Example 17, the subject matter of Examples 12-16 includes, wherein the instructions when executed further configure the one or more processors of the management data analytics service producer to: determine, from the request, from which of a plurality of network objects to collect the performance measurements to generate the management analytical data, the network objects comprising a Network Function (NF), a Network Slice Instance (NSI), a Network Slice Subnet Instance (NSSI), a subnetwork or the 5G network, and if the KPI is predicted uplink traffic volume associated with the network object, collect as the performance data: uplink data volume of a cell for which the uplink data volume is to be predicted, average uplink data volume of at least one neighbor NR cell, average uplink data volume of at least neighbor Long Term Evolution (LTE) cells, a number of incoming handovers from the at least one NR cell, and a number of incoming handovers from the at least one LTE cell.

In Example 18, the subject matter of Examples 12-17 includes, wherein the instructions when executed further configure the one or more processors of the management data analytics service producer to: determine that the future period is an upcoming limited time period of a day of a current week, and collect as the performance data multiple sets of performance data from a limited time period of a day of at least one previous week that corresponds to the upcoming limited time period of the day of the current week.

Example 19 is an apparatus of a management data analytics service producer in a fifth generation (5G) network, the apparatus comprising: processing circuitry arranged to: determine a configuration and physical resources and virtual resources in a network; receive a request for a management data analytical key performance indicator (KPI) from a consumer of a management data analytics service (MDAS) provided by the MDAF; determine, from the request, from which of a plurality of network objects to collect the performance measurements to generate the management analytical data, the network objects comprising a Network Function (NF), a Network Slice Instance (NSI), a Network Slice Subnet Instance (NSSI), a subnetwork or the network; collect performance data of a network object in the network for a past period; generate management analytical data based on the collected performance data; and determine a management data analytical key performance indicator (KPI) for a future period, the network performance data for the past period related to the future period, the management data analytical KPI to predict one of: uplink or downlink traffic volume or resource utilization associated with the network object; and a memory arranged to store the KPI.

In Example 20, the subject matter of Example 19 includes, wherein the processing circuitry is further configured to: if the KPI is predicted downlink traffic volume associated with the network object, collect as the performance data: downlink data volume of a cell for which the downlink data volume is to be predicted, average downlink data volume of at least one neighbor NR cell, average downlink data volume of at least neighbor Long Term Evolution (LTE) cells, a number of incoming handovers from the at least one NR cell, and a number of incoming handovers from the at least one LTE cell, and if the KPI is predicted uplink traffic volume associated with the network object, collect as the performance data: uplink data volume of the cell, average uplink data volume of the at least one neighbor NR cell, average uplink data volume of the at least neighbor LTE cells, a number of incoming handovers from the at least one NR cell, and a number of incoming handovers from the at least one LTE cell.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus comprising:
   one or more processors, arranged to cause a management data analytics service producer in a cellular network to:
   determine physical resources and virtual resources of network functions (NFs) in the cellular network;
   receive a request for a management data analytical key performance indicator (KPI) from a consumer;
   collect performance data of a network object in the cellular network for a past period, the network object comprising at least one of the NFs;
   generate management analytical data based on the collected performance data;
   determine a KPI for a future period related to the past period, the KPI to predict one of: uplink or downlink traffic volume or resource utilization associated with the network object; and
   report the KPI to the consumer for adjustment of resources in the cellular network based on the KPI or to trigger an alarm to indicate that the resources in the cellular network are to be adjusted based on the KPI;
   wherein, if the KPI is predicted downlink traffic volume associated with the network object, collecting the performance data includes collecting:
   downlink data volume of a cell for which the downlink data volume is to be predicted,
   average downlink data volume of at least one neighbor NR cell, average downlink data volume of at least neighbor one Long Term Evolution (LTE) cell,
   a number of incoming handovers from the at least one NR cell, and
   a number of incoming handovers from the at least one LTE cell.

2. The apparatus of claim 1, wherein the one or more processors are further configured to:
   determine, from the request, from which of a plurality of network objects to collect the performance measurements to generate the management analytical data, the network objects comprising a Network Function (NF), a Network Slice Instance (NSI), a Network Slice Subnet Instance (NSSI), a subnetwork or the cellular network.

3. The apparatus of claim 2, wherein the one or more processors are further configured to:
   if the network objects comprise the NF, determine whether the performance measurements can be collected by an existing NF measurement job, and if a new NF measurement job for the NF is to be created, create the new NF measurement job,
   if the network objects comprise the NSI, determine whether the performance measurements can be collected by an existing NSI measurement job for NFs associated with the NSI, and if a new NSI measurement job for the NFs associated with the NSI is to be created, create the NSI new measurement job, and if the network objects comprise the NSSI, determine whether the NSSI performance measurements can be collected by an existing NSSI measurement job for NFs associated with the NSSI, and if a new NSSI measurement job for the NFs associated with the NSSI is to be created, create the new NSSI measurement job.

4. The apparatus of claim 2, wherein the one or more processors are further configured to:
report a recommendation to take an action based on the KPI, the action comprising at least one of scaling of resources, admission control, or load balancing of traffic for the network object.

5. The apparatus of claim 4, wherein the one or more processors are further configured to:
if the network objects comprise further constituent network objects, report a recommendation to take an action on the constituent network objects based on the KPI, the action comprising at least one of scaling of resources, admission control, or load balancing of traffic for at least one of the constituent network objects.

6. The apparatus of claim 1, wherein the management data analytics service producer is a management data analytics function (MDAF).

7. The apparatus of claim 1, wherein the one or more processors are further configured to:
if the KPI is predicted resource utilization associated with the network object, bin the resource utilization by probability of resource shortage or excess, each bin indicating a percentage of the resources that are short or in excess.

8. The apparatus of claim 1, wherein:
each bin indicates a different 1% percentage of the resources that are short or in excess.

9. The apparatus of claim 1, wherein the one or more processors are further configured to:
if the KPI is predicted uplink traffic volume associated with the network object, collect as the performance data:
uplink data volume of a cell for which the uplink data volume is to be predicted,
average uplink data volume of at least one neighbor NR cell,
average uplink data volume of at least neighbor one Long Term Evolution (LTE) cell,
a number of incoming handovers from the at least one NR cell, and
a number of incoming handovers from the at least one LTE cell.

10. The apparatus of claim 1, wherein the one or more processors are further configured to:
determine that the future period is an upcoming limited time period of a day of a current week, and
collect as the performance data multiple sets of performance data from a limited time period of a day of at least one previous week that corresponds to the upcoming limited time period of the day of the current week.

11. A non-transitory computer-readable storage medium that stores instructions for execution by one or more processors of a management data analytics service producer in a cellular network, the instructions when executed configure the one or more processors of the management data analytics service producer to:
determine physical and virtual resources of network functions (NFs) in the cellular network;
receive a request for a management data analytical key performance indicator (KPI) from a consumer;
determine that performance measurements to determine the KPI are unable to be collected by an existing measurement job and create a new measurement job;
collect performance data of a network object in the cellular network for a past period using the measurement job, the network object comprising at least one of the NFs;
generate management analytical data based on the collected performance data;
determine the management data analytical KPI for a future period that corresponds with the past period, the management data analytical KPI to predict uplink or downlink traffic volume or resource utilization associated with the network object; and
report the KPI to the consumer for adjustment of resources in the cellular network based on the management data analytical KPI or to trigger an alarm to indicate that the resources in the cellular network are to be adjusted based on the management data analytical KPI.

12. The medium of claim 11, wherein the instructions when executed further configure the one or more processors of the management data analytics service producer to:
determine, from the request, from which of a plurality of network objects to collect the performance measurements to generate the management analytical data, the network objects comprising a Network Function (NF), a Network Slice Instance (NSI), a Network Slice Subnet Instance (NSSI), a subnetwork or the cellular network, and
report a recommendation to take an action based on the KPI, the action comprising at least one of scaling of resources, admission control, or load balancing of traffic for the network object.

13. The medium of claim 11, wherein the instructions when executed further configure the one or more processors of the management data analytics service producer to:
determine, from the request, from which of a plurality of network objects to collect the performance measurements to generate the management analytical data, the network objects comprising a Network Function (NF), a Network Slice Instance (NSI), a Network Slice Subnet Instance (NSSI), a subnetwork or the cellular network, and
if the network object comprises further constituent network objects, report a recommendation to take an action on the constituent network objects based on the KPI, the action comprising at least one of scaling of resources, admission control, or load balancing of traffic for at least one of the constituent network objects.

14. The medium of claim 11, wherein the instructions when executed further configure the one or more processors of the management data analytics service producer to:
determine, from the request, from which of a plurality of network objects to collect the performance measurements to generate the management analytical data, the network objects comprising a Network Function (NF), a Network Slice Instance (NSI), a Network Slice Subnet Instance (NSSI), a subnetwork or the cellular network, and
if the KPI is predicted resource utilization associated with the network object, bin the resource utilization by probability of resource shortage or excess, each bin indicating a percentage of the resources that are short or in excess.

15. The medium of claim 11, wherein the instructions when executed further configure the one or more processors of the management data analytics service producer to:
  determine, from the request, from which of a plurality of network objects to collect the performance measurements to generate the management analytical data, the network objects comprising a Network Function (NF), a Network Slice Instance (NSI), a Network Slice Subnet Instance (NSSI), a subnetwork or the cellular network, and
  if the KPI is predicted downlink traffic volume associated with the network object, collect as the performance data: downlink data volume of a cell for which the downlink data volume is to be predicted, average downlink data volume of at least one neighbor NR cell, average downlink data volume of at least one neighbor Long Term Evolution (LTE) cell, a number of incoming handovers from the at least one NR cell, and a number of incoming handovers from the at least one LTE cell.

16. The medium of claim 11, wherein the instructions when executed further configure the one or more processors of the management data analytics service producer to:
  determine, from the request, from which of a plurality of network objects to collect the performance measurements to generate the management analytical data, the network objects comprising a Network Function (NF), a Network Slice Instance (NSI), a Network Slice Subnet Instance (NSSI), a subnetwork or the cellular network, and
  if the KPI is predicted uplink traffic volume associated with the network object, collect as the performance data: uplink data volume of a cell for which the uplink data volume is to be predicted, average uplink data volume of at least one neighbor NR cell, average uplink data volume of at least one Long Term Evolution (LTE) cell eell-s, a number of incoming handovers from the at least one NR cell, and a number of incoming handovers from the at least one LTE cell.

17. The medium of claim 11, wherein the instructions when executed further configure the one or more processors of the management data analytics service producer to:
  determine that the future period is an upcoming limited time period of a day of a current week, and
  collect as the performance data multiple sets of performance data from a limited time period of a day of at least one previous week that corresponds to the upcoming limited time period of the day of the current week.

18. An apparatus comprising:
  one or more processors, arranged to cause a management data analytics service producer in a cellular network to:
    determine a configuration of physical resources and virtual resources in a network;
    receive a request for a management data analytical key performance indicator (KPI) from a consumer of a management data analytics service (MDAS) provided by a management data analytics function (MDAF);
    determine, from the request, from which of a plurality of network objects to collect performance measurements to generate the management analytical data, the network objects comprising a Network Function (NF), a Network Slice Instance (NSI), a Network Slice Subnet Instance (NSSI), a subnetwork or the network;
    collect performance data of a network object in the network for a past period;
    generate management analytical data based on the collected performance data; and
    determine a management data analytical key performance indicator (KPI) for a future period, the network performance data for the past period related to the future period, the management data analytical KPI to predict one of: uplink or downlink traffic volume or resource utilization associated with the network object;
    wherein, if the KPI is predicted uplink traffic volume associated with the network object, collecting the performance data includes collecting: uplink data volume of a cell for which the uplink data volume is to be predicted, average uplink data volume of the at least one neighbor new radio (NR) cell, average uplink data volume of the at least one neighbor long term evolution (LTE) cell, a number of incoming handovers from the at least one NR cell, and a number of incoming handovers from the at least one LTE cell.

19. The apparatus of claim 18, wherein:
  if the KPI is predicted downlink traffic volume associated with the network object, collecting the performance data includes collecting: downlink data volume of a cell for which the downlink data volume is to be predicted, average downlink data volume of at least one neighbor NR cell, average downlink data volume of the at least one neighbor LTE cell, a number of incoming handovers from the at least one NR cell, and a number of incoming handovers from the at least one LTE cell.

20. The apparatus of claim 18, wherein the one or more processors are further configured to:
  determine, from the request, from which of a plurality of network objects to collect the performance measurements to generate the management analytical data, the network objects comprising a Network Function (NF), a Network Slice Instance (NSI), a Network Slice Subnet Instance (NSSI), a subnetwork or the cellular network.

* * * * *

UNITED STATES PATENT AND TRADEMARK OFFICE
CERTIFICATE OF CORRECTION

PATENT NO. : 11,729,067 B2
APPLICATION NO. : 17/256787
DATED : August 15, 2023
INVENTOR(S) : Joey Chou et al.

It is certified that error appears in the above-identified patent and that said Letters Patent is hereby corrected as shown below:

In the Claims

Column 21 Line 36, delete "eell-s".

Column 22 Line 6, delete "the management" and insert --management--.

Column 22 Line 28, delete "the at least" and insert --at least--.

Signed and Sealed this
Ninth Day of January, 2024

Katherine Kelly Vidal
*Director of the United States Patent and Trademark Office*